US005706653A

United States Patent [19]
Shoji et al.

[11] Patent Number: 5,706,653
[45] Date of Patent: Jan. 13, 1998

[54] SECONDARY AIR SUPPLYING APPARATUS FOR INTERNAL COMBUSTION ENGINE

[75] Inventors: Makoto Shoji, Zama; Youichi Kishimoto, Chigasaki, both of Japan

[73] Assignee: Nissan Motor Co., Ltd., Kanagawa, Japan

[21] Appl. No.: 610,005

[22] Filed: Mar. 4, 1996

[30] Foreign Application Priority Data

Mar. 7, 1995 [JP] Japan ................... 7-046011

[51] Int. Cl.$^6$ ........................... F01N 3/22
[52] U.S. Cl. ................. 60/276; 60/277; 60/289
[58] Field of Search ............... 60/275, 277, 289, 60/290, 293

[56] References Cited

U.S. PATENT DOCUMENTS

| | | | |
|---|---|---|---|
| 5,119,631 | 6/1992 | Kayanuma et al. | 60/277 |
| 5,325,663 | 7/1994 | Itoh | 60/277 |
| 5,333,446 | 8/1994 | Itoh | 60/277 |
| 5,381,658 | 1/1995 | Meguro | 60/277 |
| 5,526,642 | 6/1996 | Dambach et al. | 60/277 |

FOREIGN PATENT DOCUMENTS

| | | |
|---|---|---|
| 64-16959 | 1/1989 | Japan . |
| 5-133221 | 5/1993 | Japan . |
| 5-203611 | 8/1993 | Japan . |

*Primary Examiner*—Willis R. Wolfe
*Attorney, Agent, or Firm*—Lowe, Price, LeBlanc & Becker

[57] ABSTRACT

A secondary air supply apparatus for an internal combustion engine is provided with an air-fuel ratio sensor disposed upstream of an catalytic converter in an exhaust passage. An outlet port of a secondary air supply conduit is formed upstream of and in the vicinity of the air-fuel ratio sensor. Air discharged from an air pump is supplied to the exhaust passage through the secondary air supply conduit. A control unit diagnoses as to whether or not the air-fuel ratio sensor is activated by checking as to whether a detection signal of the air-fuel ratio sensor is out of a predetermined range or not. Then, the control unit diagnoses as to whether the supply of the secondary air is normal or not on the basis of the detection signal of the air-fuel ratio sensor. Therefore, the diagnosis of the supply of the secondary air is correctly executed.

9 Claims, 3 Drawing Sheets

SECONDARY AIR SUPPLYING APPARATUS FOR INTERNAL COMBUSTION ENGINE

BACKGROUND OF THE INVENTION

1. Field of the Invention

The present invention relates to a secondary air supply apparatus for an internal combustion engine which apparatus is arranged to supply fresh air into an exhaust passage under a predetermined engine operating condition in order to improve a conversion efficiency of a catalytic converter, and more particularly to a secondary air supply apparatus which employs a diagnosing section for diagnosing an abnormality of the supply of secondary air.

2. Description of the Prior Art

Generally, an internal combustion engine for an automotive vehicle is provided with a three-way catalytic converter in an exhaust passage to control HC (hydrocarbons), CO (carbon monoxide) and $NO_x$ (oxides of nitrogen). Further, a secondary air supply apparatus is installed to the engine so that the catalytic converter effectively executes a conversion of exhaust gases. Namely, in case that the air-fuel ratio is fixed at a predetermined rich mixture in order to improve the combustion stability of the engine, it is difficult to sufficiently execute an oxidation reaction of the catalytic converter due to the lack of oxygen in exhaust gases. Accordingly, the secondary air supply apparatus is provided so that such lack of oxygen in the exhaust gases is solved by supplying secondary air into the exhaust passage. Therefore, if the secondary air is not sufficiently supplied to the exhaust passage due to some reasons such as decreasing of a cross-sectional area of the secondary air supply passage, the conversion by the catalysis is not sufficiently executed. For example, HC and so on in the exhaust gases are increased and the conversion efficiency of the catalytic converter is further degraded due to the lowering of the temperature of the converter. In order to solve such troubles, Japanese Patent Provisional Publication No. 5-133221 discloses a secondary air supply apparatus with a secondary air supply diagnosis section wherein the air-fuel ratio in the exhaust gases is detected through an air-fuel ratio sensor (oxygen sensor) when the secondary air is to be supplied, and the diagnosis section decides that the secondary air is supplied normally when the air-fuel ratio sensor outputs a signal indicative of a lean mixture condition. Due to this secondary air supply apparatus with the diagnosis section, it becomes possible to prevent abnormal condition from being continued. However, the supply of secondary air may cause the cooling of the air-fuel ratio sensor and therefore the air-fuel ratio sensor may output inappropriate signal, that is, a signal indicative of abnormality may be outputted even if the secondary air supply apparatus is operated in a normal condition. In general, the air-fuel ratio sensor has a characteristic that its inner resistance radically increases according to the lowering of its temperature. Therefore, the level of the detection signal of the air-fuel ratio sensor is lowered to a reference voltage such as to 280 mV according to the lowering of the temperature, although the level of the detection signal becomes about 600 mV in the rich mixture condition and about 100 mV in the lean mixture condition when the air-fuel ratio sensor is in an activated temperature condition. Accordingly, in case that the detection signal is generally kept in the vicinity of the reference voltage due to the cooling of the sensor by secondary air, the detection signal of the air-fuel ratio sensor does not reach the predetermined lean level even if the air-fuel ratio of the exhaust gases is actually set in the lean condition by the supply of the secondary air. Therefore, in such case, the diagnosis device may incorrectly decide that the secondary air supply apparatus goes wrong. On the other hand, in case that the air-fuel ratio sensor is disposed far from a port for the secondary air, although it is possible to weaken the influence of the cooling by the secondary air to the sensor, this arrangement degrades the responsibility of the sensor and therefore the diagnosing time is elongated.

SUMMARY OF THE INVENTION

It is an object of the present invention to provide an improved secondary air supply apparatus which accurately executes a diagnosis as to the normality of the supply of secondary air on the basis of the change of air-fuel ratio of exhaust gases.

A secondary air supply apparatus according to the present invention is for an internal combustion engine which is provided with a catalytic converter in its exhaust passage. The secondary air supply apparatus comprises a secondary air supplying means which supplies secondary air to the exhaust passage. An air-fuel ratio detecting means detects air-fuel ratio of gases in the exhaust passage and outputs a signal indicative of the air-fuel ratio. The air-fuel ratio detecting means is disposed in the exhaust passage downstream of a secondary air supply port of the secondary air supplying means. A diagnosis means diagnoses as to whether secondary air is normally supplied to the exhaust passage. The diagnosing means includes an activity decision means for deciding as to whether said air-fuel ratio detecting means is activated when secondary air is supplied to the exhaust passage and a secondary air supplying means diagnosing means for deciding as to whether secondary air is normally supplied to the exhaust passage on the basis of a signal from said air-fuel ratio detecting means when said activity decision means decides that said air-fuel ratio detecting means is activated.

DETAILED DESCRIPTION OF THE INVENTION

Figure 1:
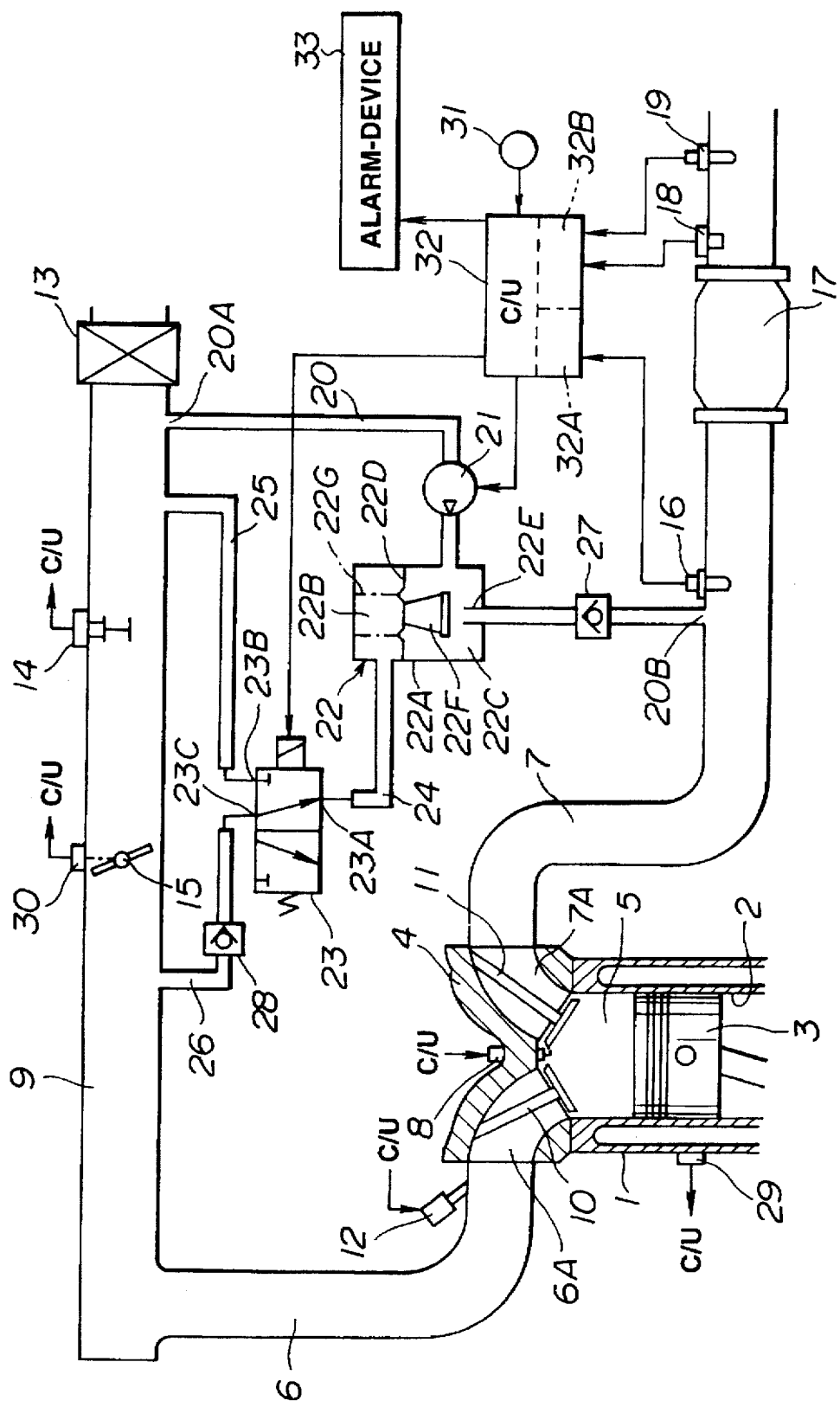
FIG. 1 is a schematic view of an embodiment of a secondary air supply apparatus for an internal combustion engine in accordance with the present invention.
Figure 2:
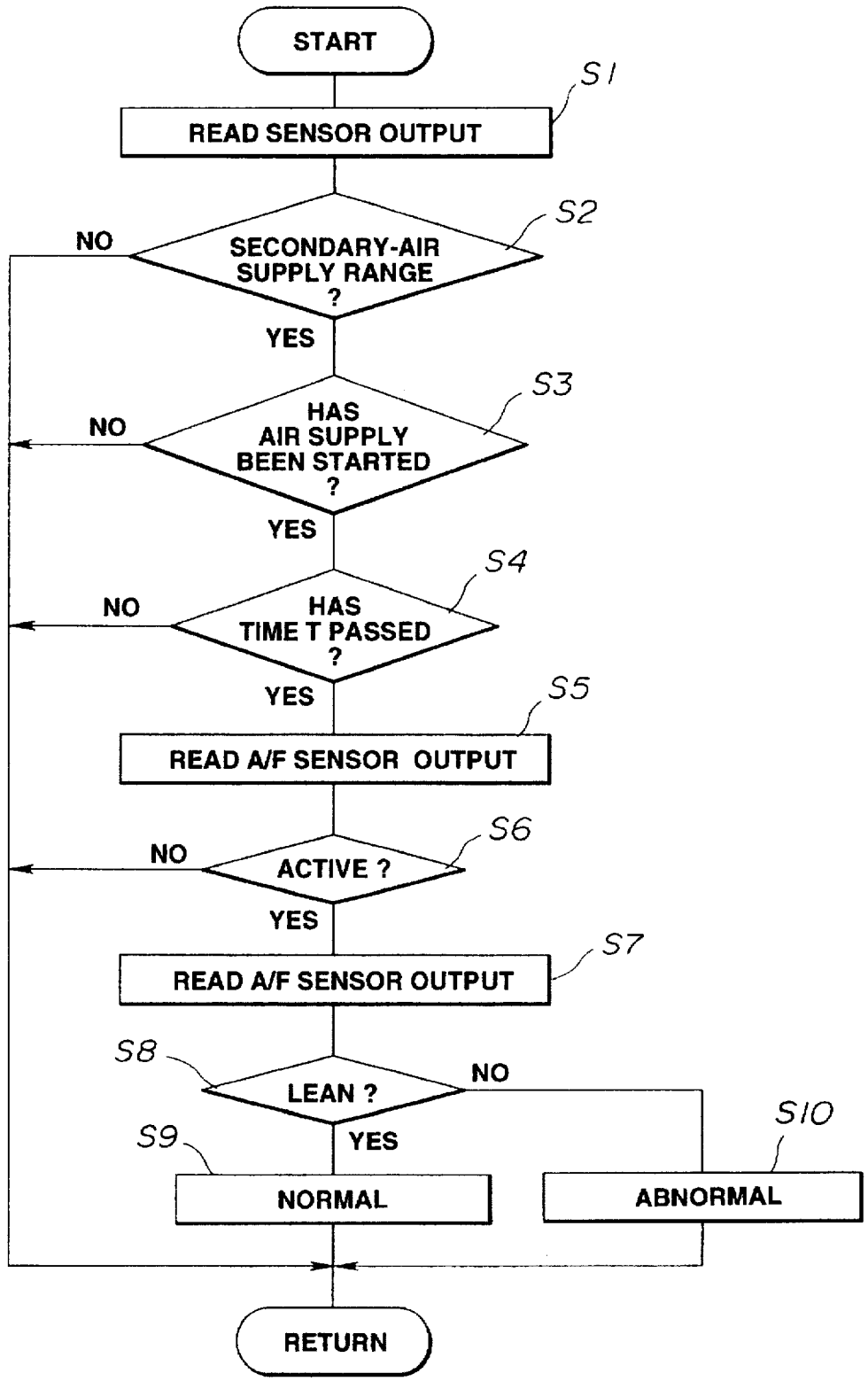
FIG. 2 is a flowchart showing a self diagnosis process of the embodiment of FIG. 1.
Figure 3:
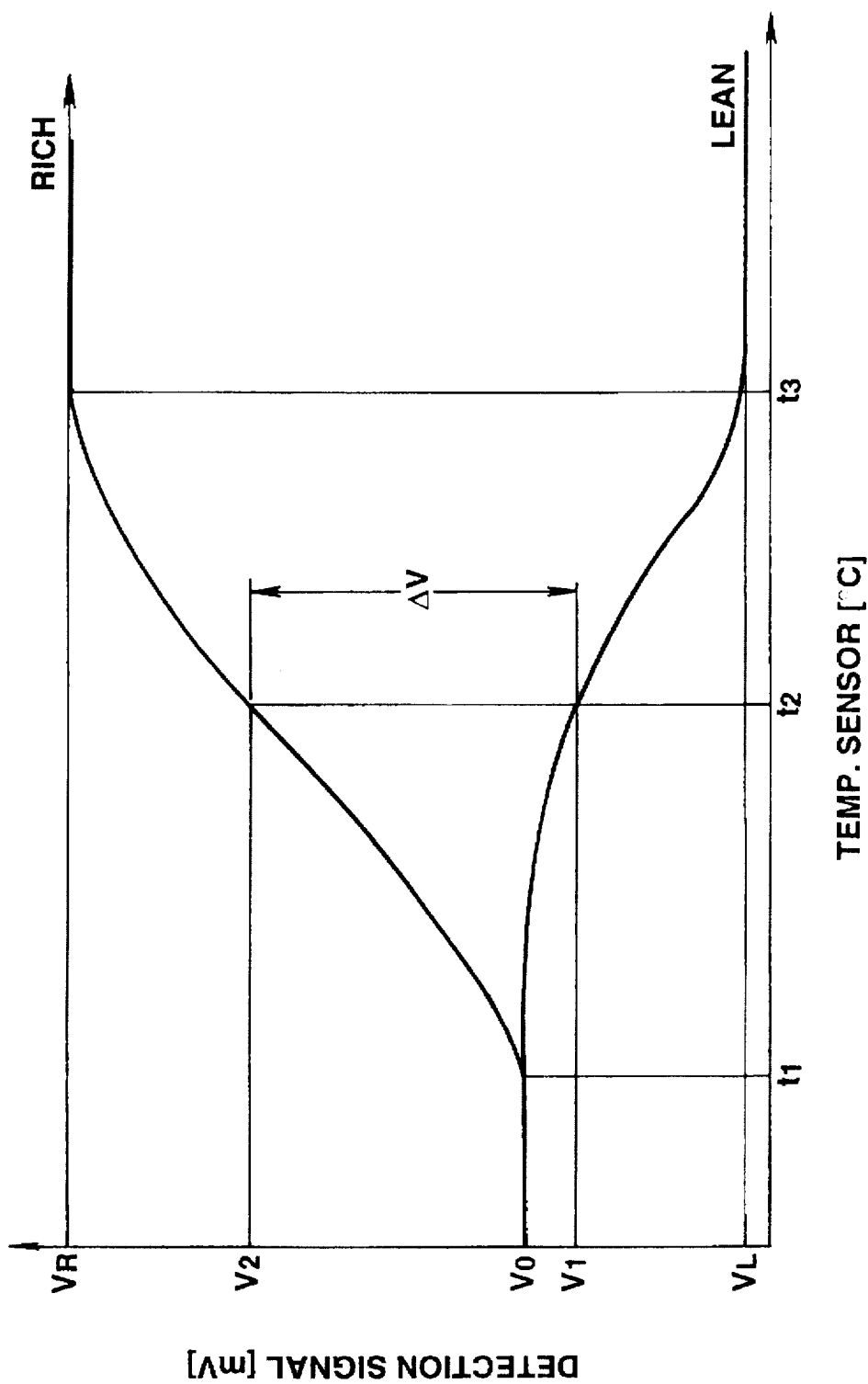
FIG. 3 is a graph which shows characteristics of an air-fuel ratio sensor applied to the secondary air supply apparatus of FIG. 1.

Referring to FIGS. 1 to 3, there is shown an embodiment of a secondary-air supply apparatus for an internal combustion engine in accordance with the present invention.

As shown in FIG. 1, an internal combustion engine is constituted such that a plurality of cylinders 2 are aligned in a cylinder block 1 and a piston 3 is disposed in each cylinder 2. An upper portion of each of the cylinders 2 is sealingly connected with a cylinder head 4 so that a combustion chamber 5 is defined by the piston 3, the cylinder 2 and the cylinder head 4. An intake port 6A and an exhaust port 7A are formed in the cylinder head 4 so as to be opposite with each other. A spark plug 8 is embedded in cylinder head 4 so as to fire air-fuel mixture in the combustion chamber 5 by generating a spark according to a spark signal from a control unit (C/U) 32.

The intake port 6A is formed such that one inlet passage is branched into two outlet passages. The inlet passage of the intake port 6A is connected with an intake air passage 6 which is connected with a collective intake passage 9 which is disposed upstream of the intake air passage 6 with respect to the flow of intake air to the internal combustion engine 1. An intake valve 10 is disposed in the cylinder head 4 so as to be moved by means of a valve lifting mechanism (not shown). The lifting of the intake valve 10 fluidly communicates the combustion chamber 5 and the intake port 6A. On the other hand, the exhaust port 7A is formed such that two inlet passages are combined into one outlet passage. The outlet passage of the exhaust port 7A is connected with an exhaust passage 7 to flow exhaust gases from the internal combustion engine 1. An exhaust valve 11 is disposed in the cylinder head 4 so as to be moved by means of a valve lifting mechanism (not shown). The lifting of the exhaust valve 11 fluidly communicates the combustion chamber 5 and the exhaust port 7A.

A plurality of fuel injectors 12 are disposed in the intake passage 7 to inject fuel to each intake port 6A according to a signal indicative of an fuel injection timing to each fuel injector 12 from the control unit 32. In the collective intake passage 9, an air filter 12 for removing dust in air, an air flow meter 14 for detecting an air flow amount and a throttle valve 15 for controlling the air-flow amount are disposed in the order of mention as shown in FIG. 1.

In the exhaust passage 7, a first air-fuel ratio sensor (oxygen sensor) 16 for detecting air-fuel ratio in the exhaust gases, a catalytic converter 17 for purifying the exhaust gases by accelerating the oxidation of HC, CO and reduction of NOx in the exhaust gases, an exhaust gas temperature sensor 18 for detecting a temperature of the exhaust gases, and a second air-fuel ratio sensor (oxygen sensor) 19 for detecting air-fuel ratio in the exhaust gases downstream of the catalytic converter 17 are disposed in the order of mention from upstream side to downstream side with respect to the flow of the exhaust gases.

The first and second air-fuel ratio sensors 16 and 19 are an unheated type zirconia exhaust oxygen sensor and output respective detection signals indicative of a remaining oxygen density in the exhaust gases to the control unit 32. The detection signals correspond to the electro motive force of the first and second air-fuel ratio sensors 16 and 19 disposed in the exhaust gases. The first and second air-fuel ratio sensors 16 and 19 radically and steppingly change their electro motive force when the detected condition is in the vicinity of a stoichiometric (theoretical air-fuel) ratio. For example, the air-fuel ratio sensor 16, 19 generates electro motive force of about 280 mV under ordinary temperature.

The collective intake passage 9 and the exhaust passage 7 are communicated with a secondary air passage 20. An inlet portion 20A of the secondary air passage 20 is connected with a collective intake passage 9 between the air flow meter 14 and the air filter 13. An outlet portion 20B of the secondary air passage 20 is connected with the exhaust passage 7 upstream of and in the vicinity of the first air-fuel ratio sensor 16. In the secondary air passage 20, an air pump 21, an air cut valve 22 and a check valve 27 are disposed in the order of mention. The air pump 21 draws air from the collective intake air passage 9 and discharges the air toward the air cut valve 22 upon compressing it. The air pump 21 is arranged to operate according to a drive signal from the control unit 32. The air cut valve 22 is for forcibly cutting the supply of the secondary air to the exhaust passage 7, and is constituted by a housing 22A, a diaphragm 22D, a valve spring 22D, a valve body 22F and a valve seat 22E. The diaphragm 22D divides a space defined by the housing 22 into a control chamber 22B and a secondary air chamber 22C. The secondary air chamber 22C is communicated with the collective intake air passage 9 and the exhaust passage 7 through the secondary air passage 20. The valve spring 22G is disposed in the control chamber 22B and biases the diaphragm 22D so that the valve body 22F closes the valve seat 22E which is connected to a port communicated with the exhaust passage 7. The control chamber 22B is connected to an electromagnetic valve 23 so that the valve body 22F closes and opens the valve seat 22E according a pilot pressure supplied from the electromagnetic valve 23. The check valve 27 disposed downstream of the air cut valve 22 is disposed so as to allow the air flow from the collective intake air passage 9 to the exhaust passage 7 and to forbid the air flow from the exhaust passage 7 to the collective intake air passage 9.

The electromagnetic valve 23 is a return-spring type solenoid valve of a three-port and two-position type. The electromagnetic valve 23 includes an outlet port 23A, a first inlet port 23B and a second inlet port 23C. The outlet port 23A is connected to the control chamber 22B of the air cut valve 22 through a pilot tube 24. The first inlet port 23B is connected to the collective intake passage 9 located between the air flow meter 14 and the air filter 13 through a first conduit 25. The second inlet port 23C is connected to the correct intake air passage downstream of the throttle valve 15 through a second conduit 26. A check valve 28 is disposed in the second conduit 26 in order to prevent the air from flowing from the control chamber 22B to the collective intake passage 9. When the electromagnetic valve 23 does not receive electric power as a normal condition, that is, when the control signal from the control unit 32 is not supplied to the electromagnetic valve 23, the first inlet port 23B is communicated with the outlet port 23A so that atmospheric air is supplied to the control chamber 22B through the first conduit 25. In this normal condition, the air cut valve 22 functions to cut the supply of the secondary air to the exhaust passage 7. On the other hand, when the electromagnetic valve 23 receives electric power according to the control signal from the control unit 32, the second inlet port 23C is communicated with the outlet port 23A so that the negative pressure of the collective intake air passage 9 downstream of the throttle valve 30 is supplied to the control chamber 22B by drawing the air in the control chamber 22B to the collective intake air passage 9. In this negative pressure condition of the control chamber 22B, the valve body 22F is released from the valve seat 22C while the valve spring 22G is biased, so that the secondary air is supplied to the exhaust passage 7.

Although the air pump 21, the air cut valve 22 and the electromagnetic valve 23 function as a secondary air supply means in this embodiment, it will be understood that the secondary air supply means may be constituted so that the secondary air is supplied by means of the atmospheric pressure without using an air pump.

The control unit 32 includes an activity deciding section 32A for deciding the activity of the first air-fuel ratio sensor 16 and a secondary air supplying condition deciding section 32B for deciding a condition of the secondary air supply system. The control unit 32 is a microcomputer system constituted by a calculating circuit such as a CPU, a memory circuit such as ROM and RAM, and an input-output circuit. The control unit 32 is electrically connected to the air flow meter 14, a throttle sensor 30, a temperature sensor 29, a crankangle sensor 31, the first and second air-fuel ratio sensors 16 and 19, and the exhaust gas temperature sensor 18. The air flow meter 14 outputs a signal indicative of the air flow amount to the control unit 32. The throttle sensor 30 detects an opening degree of the throttle valve 15 and outputs a signal indicative of an opening degree of the throttle valve 15 to the control unit 32. The temperature sensor 29 detects a temperature of an engine coolant and outputs a signal indicative of the detected coolant temperature to the control unit 32. The crankangle sensor 31 is installed to the engine so as to detect a rotation speed of the engine and outputs a signal indicative of the engine rotation speed to the control unit 32. The control unit 32 is electrically connected to the secondary air pump 21, the fuel injectors 12 and the spark plugs 8. Further, the control unit 32 is electrically connected to an alarm device 33 for informing an abnormal condition of the secondary air supply system to a drive.

The control unit 32 executes a feedback control of the fuel injection amount from the injectors 12 according to the detection signals from the first anal second air-fuel ratio sensors 16 and 19 and further executes a diagnosis of the secondary air supply system. That is, the control unit 32 calculates a base fuel injection amount Tp on the basis of the intake air amount Q detected by the air flow meter 14 and an engine rotation speed N detected by the crankangle sensor 31 (Tp=Q/N). Further, the base fuel injection amount Tp is corrected into an optimum fuel injection amount Ti by means of an air-fuel ratio feedback correction and a various increasing correction such as an increasing correction relating to the coolant temperature.

The control unit 32 diagnoses the degradation of the catalytic converter 17 on the basis of the ratio between the signals from the first and second air-fuel ratio sensors 16 and 19. Namely, when the catalytic converter 17 is normally operated, the second air-fuel sensor 29 downstream of the catalytic converter 17 outputs a signal which indicates a long inversion period between rich and lean mixture conditions due to the oxygen storage ability of the catalysis. On the other hand, when the oxygen storage ability is degraded according to the degradation of the catalytic converter 17, the second air-fuel ratio sensor 19 outputs a signal indicative of a short inversion period which is generally similar to that of the first air-fuel ratio sensor 16 upstream of the catalytic converter 17. Therefore, it becomes possible to execute the diagnosis of the degradation of the catalytic converter 17 by checking the ratio between the signals of the first and second air-fuel ratio sensors 16 and 19.

The manner of operation of the secondary air supply system according to the present invention will be discussed hereinafter with reference to FIGS. 2 and 3.

As shown in a flowchart of FIG. 2, at a step S1 the control unit 32 reads in the signals from the air flow meter 14, the exhaust gas temperature sensor 18, the crankangle sensor 31 and the like.

At a step S2, the control unit 32 decides according the detected signals as to whether the engine operating condition is in a condition under which secondary air may be supplied to the exhaust passage 7 or not. More particularly, the control unit 32 decides as to whether the engine operating condition reaches an operation range lower than a medium load range or not. When the decision at the step S2 is "NO", that is, when the engine operation condition for supplying secondary air is not satisfied, the routine returns to the step S1. When the decision at the step S2 is "YES", that is, when the predetermined engine operating condition for supplying secondary air is satisfied, the routine proceeds to a step S3.

At the step S3, the control unit 32 decides as to whether the supply of the secondary air has been started or not. That is, the control unit 32 decides as to whether the air pump 21 is operating to discharge the drawn air from the collect intake air passage 7 into the secondary air passage 20, by checking an air-pump operation flag indicative of an operating condition of the air pump 21. When the decision at the step S3 is "NO", the routine returns to the step S2. When the decision at the step S3 is "YES", that is, when the control unit 32 checks at the step S3 that the air-pump operation flag is set due to the operation of the air pump 21, the routine proceeds to a step S4.

At the step S4, the control unit 32 judges as to whether a predetermined time period T has elapsed from a start of the operation of the air pump 21. The predetermined time period T is defined as a sufficient time period that the discharging pressure of the air pump 32 becomes stable and the secondary air surely affects the first air-fuel ratio sensor 16. Such time period T is practically about 1 to 2 seconds. That is, the predetermined time period T is previously determined as a time until the output of the first air-fuel ratio sensor 16 affected by secondary air becomes stable. When the decision at the step S4 is "YES", that is, when the discharge pressure of the air pump 21 becomes stable and the output of the first air-fuel ratio sensor 16 generally becomes constant, the routine proceeds to a step S5 wherein the control unit 32 reads in the detection signal of the first air-fuel ratio sensor 16. When the decision at the step S4 is "NO", the routine returns to the step S2.

At the step S6, the control unit 32 decides according to the detection signal of the first air-fuel ratio sensor 16 as to whether the first air-fuel ratio sensor 16 is activated or not. That is, as shown in a graph of FIG. 3, the detection signal of the first air-fuel ratio sensor 16 is generally fixed at a standard voltage $V_O$ such as about 280 mV when the temperature of the first air-fuel ratio sensor 16 is lower than or equal to a temperature $t_1$ which is of an ordinary temperature.

When the temperature of the first air-fuel ratio sensor 16 becomes higher the temperature $t_1$, the detection signal of the first air-fuel ratio sensor 16 is changed according to the condition of the exhaust gases such as a rich or lean mixture condition. More particularly, in case that the temperature of the first air-fuel ratio sensor 16 is raised to a temperature $t_3$ of FIG. 3 and the sensor 16 is sufficiently activated, the output of first air-fuel ratio sensor 16 in the rich condition saturates at the voltage $V_R$ such as about 600 to 700 mV and that in the lean condition saturates at the voltage $V_L$ such as about 100 mV.

Accordingly, if a reference voltage range $\Delta V$ is defined by a minimum reference voltage $V_1$ such as 200 mV and a maximum reference voltage $V_2$ such as 500 mV which sandwich the reference voltage $V_O$, it becomes possible to decide as to whether the first air-fuel ratio sensor 16 is activated or not, by detecting as to whether the detection signal of the first air-fuel ratio sensor 16 is within the reference voltage range $\Delta V$ or not. More particularly, the reference voltage range $\Delta V$, which indicates a range of a reference voltage in non-activated condition, is defined on the basis of the minimum reference voltage $V_1$ by which the lean mixture condition of the air-fuel ratio of the exhaust gases is clearly distinguished. In other words, it is decided as to whether the temperature of the first air-fuel ratio sensor 16 is higher than the minimum reference temperature $t_2$ at which the lean mixture condition of the air-fuel ratio can be distinguished.

When the decision at the step S6 is "NO", that is, when the detection signal of the first air-fuel ratio sensor 16 is within the reference voltage range $\Delta V$ and therefore it is decided that it is impossible to correctly detect the lean condition of the exhaust gas, the routine returns to the step S1. When the decision at the step S6 is "YES", it is decided that the detection signal of the first air-fuel ratio sensor 16 is reliable. Therefore, the routine proceeds to a step S7 wherein the control unit 32 again reads in the detection signal of the first air-fuel ratio sensor 16.

At a step S8, the control unit 32 decides according to the signal detected at the step S7 as to whether the air-fuel ratio is in the lean mixture condition or not. More particularly, the control unit 32 executes the decision as to the lean mixture condition of the air-fuel ratio by checking as to whether the detection signal of the first air-fuel sensor 16 is lower than the minimum reference voltage $V_1$ or not. When the decision at the step S8 is "YES", that is, when the air-fuel ratio in the exhaust gases is within the lean mixture condition due to the supply of the secondary air, the routine proceeds to a step S9 wherein the control unit 32 diagnoses that the operation of the secondary air supply system is normal. On the other hand, when the decision at the step S8 is "NO", that is, when the air-fuel ratio in the exhaust gases does not move to the lean condition in spite of the operation of the air pump 21, it is considered that some troubles are occurred in the part such as the secondary air supply passage 20, the first check valve 27, the air cut valve 22 or the electromagnetic valve 23. Accordingly, the control unit 32 diagnoses that the secondary air supply system goes wrong or abnormal, and informs the abnormal condition of the secondary air supply system to a vehicle driver by turning on an alarm lamp or setting an abnormal flag to display some alarm information to the driver through the alarm display 33.

It will be understood that the decision at the step S8 may be executed by using the detection signals detected at the step S5 upon canceling the signal reading-in at the step S7.

With the thus arrange secondary air supply system, the activity of the first air-fuel ratio sensor 16 during the supply of secondary air is decided by the control unit 32. Then, when the control unit 32 decides that the first air-fuel ratio sensor 16 is activated, the control unit 32 decides as to whether the supply of secondary air is normal on the basis of the signal of the first air-fuel ratio sensor 32. Therefore, the diagnosis as to the supply of secondary air is correctly executed. This diagnosis prevents the incorrect signal of the first air-fuel ratio sensor 16 from being used and therefore the reliability of this diagnosis is largely improved.

Further, the activity of the first air-fuel ratio sensor 16 is decided by comparing the detecting signal of the first air-fuel ratio sensor with the reference voltage range ΔV. That is, it is decided that the first air-fuel ratio sensor is not activated when the signal is out of the reference voltage range ΔV. Therefore, the decision as to the activity of the first air-fuel sensor 16 becomes further easy and accurate.

Additionally, since the decision of the activity of the first air-fuel ratio sensor 16 is executed after a predetermined time period has elapsed from a start of the supply of secondary air, the reliability of the diagnosis of the supply of secondary air is further improved.

What is claimed is:

1. A secondary air supply apparatus for an internal combustion engine, the internal combustion engine being provided with a catalytic converter in its exhaust passage, said secondary air supply apparatus comprising:

a secondary air supplying means for supplying secondary air to the exhaust passage;

an air-fuel ratio detecting means for detecting air-fuel ratio of gases in the exhaust passage and outputting a signal indicative, of the air-fuel ratio, said air-fuel ratio detecting means being disposed in the exhaust passage downstream of a secondary air supply port of said secondary air supplying means; and a diagnosis means for diagnosing as to whether secondary air is normally supplied to the exhaust passage, said diagnosing means including an activity decision means for deciding as to whether said air-fuel ratio detecting means is activated when secondary air is supplied to the exhaust passage, and a secondary air supplying means diagnosing means for deciding as to whether secondary air is normally supplied to the exhaust passage on the basis of a signal from said air-fuel ratio detecting means when said activity decision means decides that said air-fuel ratio detecting means is activated.

2. A secondary air supply apparatus as claimed in claim 1, wherein said secondary air supplying means includes a secondary air supply passage through which secondary air is supplied to an upstream side of the catalytic converter in the exhaust passage.

3. A secondary air supply apparatus as claimed in claim 1, wherein said activity deciding means decides as to whether said air-fuel ratio detecting means is activated or not after a predetermined time period has elapsed from a start of supplying the secondary air.

4. A secondary air supply apparatus as claimed in claim 1, wherein said diagnosing means includes an alarming means which displays alarm information indicative of an abnormality as to the supply of secondary air to an operator of the internal combustion engine when said secondary air supply diagnosing means diagnoses that the secondary air is not normally supplied to the exhaust passage.

5. A secondary air supply apparatus as claimed in claim 1, wherein said air-fuel ratio detecting means includes a first air-fuel ratio sensor disposed upstream of the catalytic converter and a second air-fuel ratio sensor disposed downstream of the catalytic converter, said diagnosing means including a catalytic converter diagnosing means which diagnoses the degradation of the catalytic converter according to a ratio between the signals of the first and second air-fuel ratio sensors.

6. A secondary air supply apparatus as claimed in claim 1, wherein said activity deciding means decides that said air-fuel ratio detecting means is not activated when the signal outputted from said air-fuel ratio detecting means is within a predetermined range in case that secondary air is supplied to the exhaust passage, and decides that said air-fuel ratio detecting means is activated when the signal outputted from said air-fuel ratio detecting means is out of the predetermined range in case that secondary air is supplied to the exhaust passage.

7. A secondary air supply apparatus as claimed in claim 6, wherein the predetermined range for the signal outputted from said air-fuel ratio detecting means is determined by a minimum reference voltage and a maximum reference voltage.

8. A secondary air supplying apparatus as claimed in claim 7, wherein the minimum reference voltage corresponds to a voltage outputted from said air-fuel ratio detecting means which is set in a condition that its temperature is higher than a predetermined temperature t2 and the air-fuel ratio is a lean mixture, and the maximum reference voltage corresponds to a voltage outputted from said air-fuel ratio detecting means which is set in a condition that its temperature is higher than a predetermined temperature t2 and the air-fuel ratio is a rich mixture.

9. An alarm system for a secondary air supply system of an internal combustion engine, comprising:

an oxygen sensor disposed in an exhaust passage upstream of a catalytic converter of the internal combustion engine, said oxygen sensor detecting an air-fuel ratio of exhaust gases supplied to the catalytic converter and outputting a signal indicative of the detected air-fuel ratio;

an oxygen sensor activity deciding means for deciding as to whether said oxygen sensor is activated when secondary air is supplied to the exhaust passage;

a secondary air supply diagnosing means for diagnosing abnormality of the supply of secondary air, said secondary air supply diagnosing means deciding as to whether the secondary air is normally supplied to the exhaust passage on the basis of a signal of the oxygen sensor when said oxygen sensor activity deciding means decides that said air-fuel ratio detecting means is activated.

* * * * *